United States Patent [19]

Sebacher et al.

[11] 4,019,868

[45] Apr. 26, 1977

[54] SOLAR HYDROGEN GENERATOR

[75] Inventors: Daniel I. Sebacher, Seaford; Alexander P. Sabol, Williamsburg, both of Va.

[73] Assignee: The United States of America as represented by the Administrator of the National Aeronautics and Space Administration, Washington, D.C.

[22] Filed: Mar. 24, 1976

[21] Appl. No.: 669,928

[52] U.S. Cl. .............................. 23/281; 23/277 R; 55/158; 423/648 R

[51] Int. Cl.[2] ........................ B01J 7/00; C01B 1/00

[58] Field of Search ............. 23/252 R, 277 R, 281, 23/282, 284; 250/527; 204/157.1 R; 126/271; 423/648; 202/234; 203/10; 55/158, 16

[56] References Cited

UNITED STATES PATENTS

| 549,765 | 11/1895 | Calver | 23/281 X |
|---|---|---|---|
| 2,718,457 | 9/1955 | McKinnis | 23/284 X |
| 2,760,920 | 8/1956 | Olsen | 202/96 |
| 2,855,274 | 10/1958 | Caillere et al. | 23/277 R X |
| 3,303,105 | 2/1967 | Konikoff et al. | 55/16 X |
| 3,607,125 | 9/1971 | Kydd | 23/277 R X |
| 3,785,931 | 1/1974 | Coffey et al. | 202/234 |
| 3,901,668 | 8/1975 | Seitzer | 55/16 |
| 3,901,669 | 8/1975 | Seitzer | 55/16 |
| 3,925,212 | 12/1975 | Tchernev | 250/527 |

*Primary Examiner*—Joseph Scovronek
*Assistant Examiner*—Arnold Turk
*Attorney, Agent, or Firm*—Howard J. Osborn; Wallace J. Nelson; John R. Manning

[57] ABSTRACT

An apparatus for using solar energy to manufacture hydrogen by dissociating water molecules into hydrogen and oxygen molecules. Solar energy is concentrated on a globe containing water thereby heating the water to its dissociation temperature. The globe is pervious to hydrogen molecules permitting them to pass through the globe while being essentially impervious to oxygen molecules. The hydrogen molecules are collected after passing through the globe and the oxygen molecules are removed from the globe.

5 Claims, 2 Drawing Figures

SOLAR HYDROGEN GENERATOR

ORIGIN OF THE INVENTION

The invention described herein was made by employees of the United States Government and may be manufactured and used by or for the Government for governmental purposes without the payment of any roylaties thereon or therefor.

BACKGROUND OF THE INVENTION

1. Field of the Invention

This invention generally relates to hydrogen generating devices and, more particularly to devices using solar energy to dissociate water molecules. The hydrogen thus generated may then be liquefied and stored for later use as a clean-burning fuel.

2. Description of the prior art

The uses of solar radiation as an energy source are well known. U.S. Pat. No. 2,141,330 to Abbott, for example, teaches a distilling apparatus in which solar energy is used to heat water to its boiling point. Similarly, U.S. Pat. No. 3,785,931 to Coffey et al teaches a still which uses solar radiation as the power source for the distillation process. Typical of other devices using solar energy are hot water heaters for home or commercial use and a variety of solar heat collectors.

While these earlier developments use solar energy as a power source for various processes, they lack the aspects of the present invention wherein solar radiation is used as the exclusive power source in a hydrogen generating device.

It is therefore an object of the present invention to provide a device for generating hydrogen using solar energy as the only power source.

A further object of the present invention is a device using the energy from solar radiation to dissociate water molecules.

An additional object of the present invention is a device for storing solar energy by collecting the hydrogen products produced from the decomposition of water for later use as a fuel.

These and other objects of the invention will be readily apparent when considered in reference to the following description and claims and when taken in connection with the attached drawings to which they relate.

SUMMARY OF THE INVENTION

According to the present invention an inlet tube is provided having a hollow globe fixably fastened to one end thereof with the other end of the inlet tube communicating with a source of water. The water is pumped through the inlet tube and into the hollow globe. As used in this specification the term water includes both the liquid and gaseous states of water molecules. Thus, either steam or liquid water may be introduced into the inlet tube.

The globe is manufactured from a material which is pervious to hydrogen molecules but which is essentially impervious to oxygen molecules and the other products of the decomposition of water. A parabolic reflector concentrates solar radiation on the globe thereby heating the water contained therein. When the water reaches its dissociation temperature it decomposes into hydrogen and oxygen molecules. The hydrogen molecules pass through the globe while the oxygen molecules and undecomposed water molecules remain contained within the globe.

A collector tube completely encloses the globe and traps the hydrogen molecules which have permeated through the globe. An outlet tube is sealably inserted into the globe for removing the oxygen molecules and undecomposed water molecules.

DESCRIPTION OF THE PREFERRED EMBODIMENT

Figure 1:
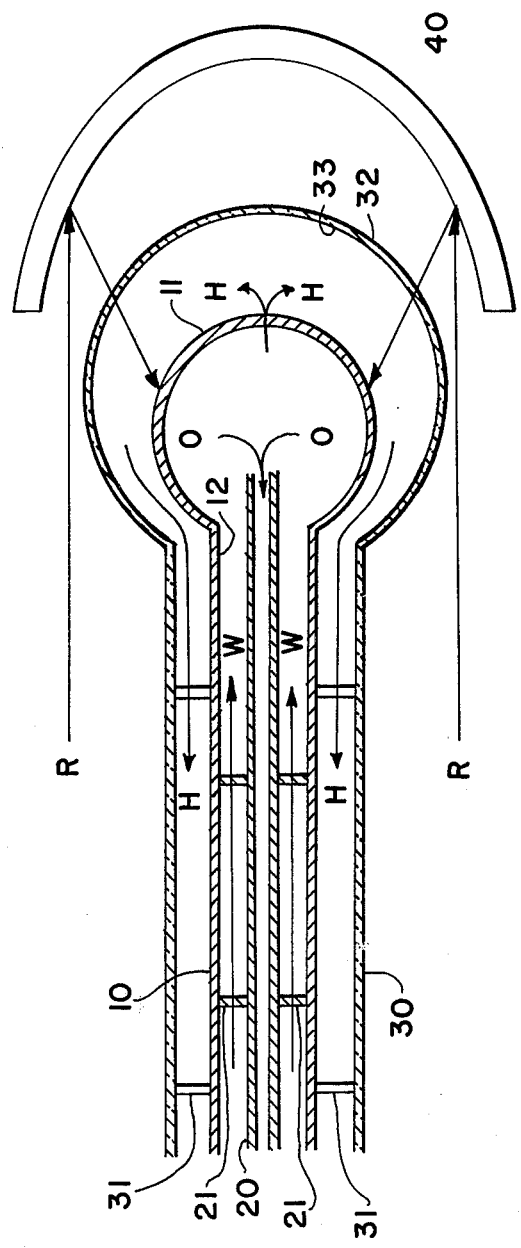
FIG. 1 is a section view taken along line $x-x$ of FIG. 2.

Referring now to the drawings, there is shown a preferred embodiment of the invention as it would be used to decompose water and to separate the resulting hydrogen molecules from the other byproducts of water decomposition. As readily seen in FIG. 1, the apparatus basically includes an inlet tube 10, an outlet tube 20, a collector tube 30 and a reflector 40.

Inlet tube 10 has a hollow globe 11 sealably affixed to end 12. In the preferred embodiment, inlet tube 10 is manufactured from stainless steel although any material suitable for conveying steam may be used. Mterials capable of withstanding the temperatures required to dissociate water molecules (approximately 2800° K.) are used to manufacture globe 11. In addition, the material used for globe 11 must be pervious to hydrogen molecules while being essentially impervious to the other products of water decomposition. The high temperatures required to dissociate water molecules and the reactive nature of the gases being produced make oxide ceramics suitable choices for the manufacture of globe 11. In the preferred embodiment, for example, globe 11 is manufactured from thorium oxide although zirconium oxide could also be used.

Reflector 40 is used to concentrate solar energy on globe 11 and in the preferred embodiment is a parabolic mirror of conventional design. By concentrating the solar radiation onto globe 11, the temperature of globe 11 is increased to the dissociation temperature of water.

Outlet tube 20 is positioned concentrically inside inlet tube 10 having one end protruding into globe 11. A plurality of tubular supports 21 are annularly spaced between outlet tube 20 and inlet tube 10 thereby holding outlet tube 20 in place. Any suitable material such as stainless steel may be used to manufacture outlet tube 20.

Collector tube 30 is positioned concentrically around inlet tube 10 and is held in place by tubular supports 31. Collector 30 has an enlarged end 32 which sealably encloses globe 11. In the preferred embodiment collector tube 30 and enlarged end 32 are manufactured from Pyrex glass.

OPERATION

Figure 2:
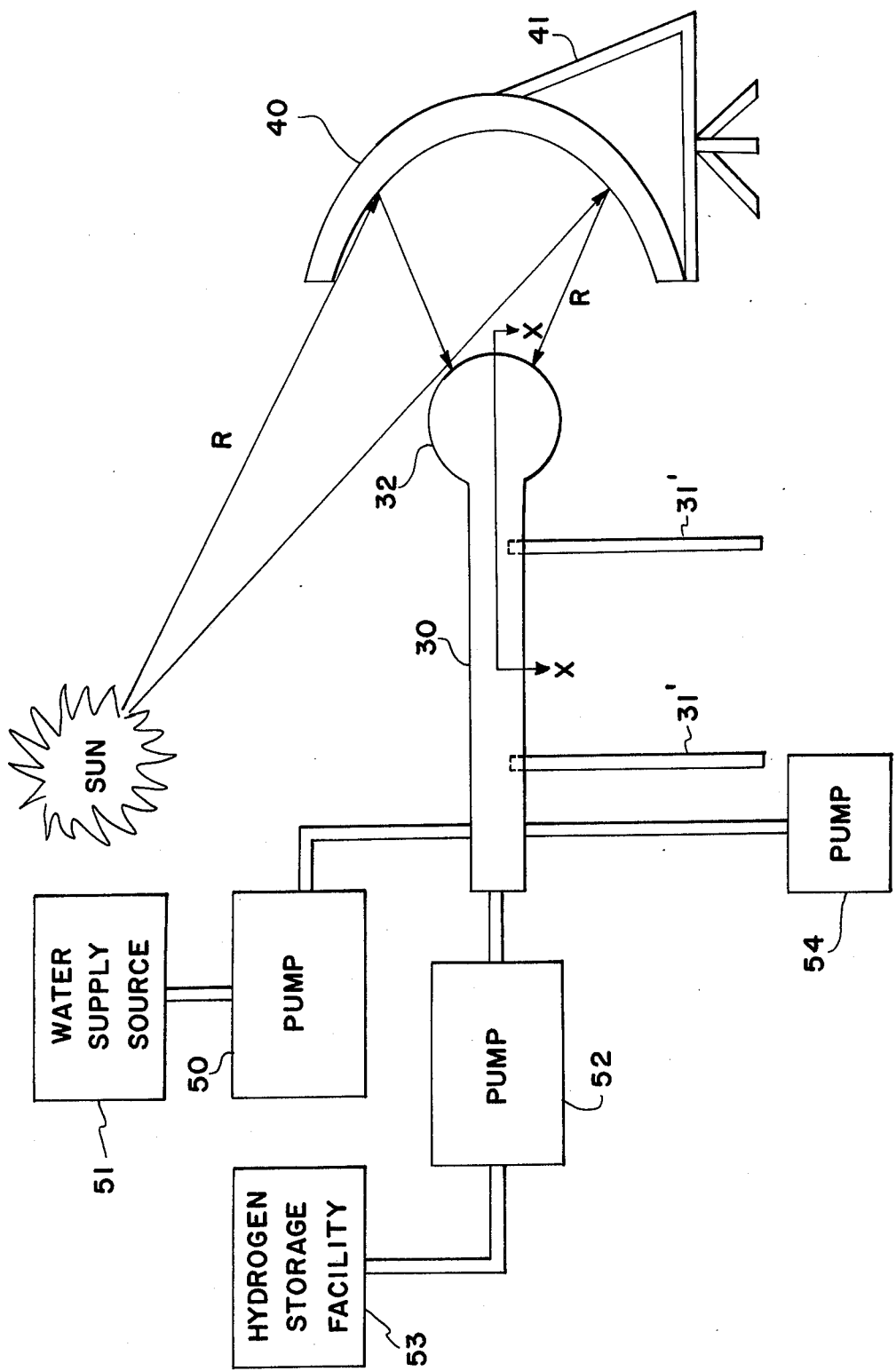
FIG. 2 is a block diagram of the present invention.

Referring now to FIG. 2, collector tube 30 is supported by a plurality of rigid supports 31' such that the center of globe 11 coincides with the center of parabolic reflector 40 which is held in place by supports 41. Pumps 50, 52 and 54 communicate with tubes 10, 20 and 30, respectively, for purposes to be described below.

Pump 50 communicates with inlet tube 10 and pumps water from water supply source 51 through inlet tube 10 and into globe 11 generally following path W. Reflector 40 concentrates solar radiation on globe 11 thereby heating the water contained therein until the water reaches its dissociation temperature (approximately 2800° K.) at which time the water molecules decompose into hydrogen and oxygen molecules. The hydrogen molecules permeate through globe 11 and generally follow path H. To facilitate the flow of hydrogen molecules a pump 52 communicates with collector tube 30 thereby maintaining the interior of collector tube 30 at a lower pressure than the interior of globe 11. Pump 52 also serves to pump the hydrogen molecules into hydrogen storage facility 53 for storage and later use.

Outlet tube 20 communicates with pump 54 which maintains the interior of outlet tube 20 at a lower pressure than the interior of globe 11. Thus, the oxygen molecules which are not permitted to pass through globe 11 enter outlet tube 20 and are removed generally following path O.

The rate at which hydrogen is produced is in part a function of the diameter of globe 11 and of the hydrogen diffusion rate of globe 11. The diameter of globe 11 in turn depends upon the diameter of reflector 40. Knowing the direct solar radiation falling on the reflector 40, it is possible to use the Stefan-Boltzmann law to determine the degree to which reflector 40 must concentrate the available solar energy. According to the Stefan-Boltaman law $W = \epsilon \sigma (T_1^4 - T_2^4)$ where:

$W$ = solar energy available
$\epsilon$ = emissivity of the absorbing body
$\sigma$ = Stefan-Boltzmann constant (5.7 × 10$^{-5}$ ergs cm$^{-2}$ sec $^{-1}$)

$T_1$ = Temperature of radiating body
$T_2$ = Temperature of absorbing body

In the present invention the absorbing body is globe 11 which is heated to the dissociation temperature of water (2800° K approximately) and the radiating body is the sum which has a temperature of approximately 6000° K. The concentration which must be achieved by reflector 40 is determined by using the Stefan-Boltzmann equation as follows:

$$K = \frac{\epsilon \sigma (T_1^4 - T_2^4)}{W}$$

where
$K$ = concentration required

For example, assuming the direct solar energy falling on reflector 40 is 0.6 watts/cm$^2$ (W) and the emissivity ($\epsilon$) of globe 11 is 0.2 the Stefan-Boltzmann law indicates that a solar concentration of approximately 2000 is required. For a parabolic reflector the solar concentration is equal to the square of the ratio of the diameter of the reflector to the diameter of the area heated (i.e., the diameter of globe 11). Thus, if a solar concentration of 2000 is required and the reflector 40 has a diameter of 45 cm the diameter of the globe 11 should be approximately 1 cm. Water should then enter globe 11 at a rate equal to the rate at which hydrogen diffuses through a 1 cm diameter globe.

Tubes 10, 20 and 30 are arranged concentrically in the preferred embodiment to efficiently utilize the heat contained in the oxygen and hydrogen molecules. The concentric arrangement permits the heat in the higher temperature oxygen and hydrogen molecules in outlet tube 20 and collector tube 30, respectively, to be transferred to the lower temperature water in inlet tube 10. Other arrangements of tubes 10, 20 and 30 may suggest themselves to one skilled in the art. It will be understood that the foregoing descripton is of the preferred embodiment of the invention and is therefore merely representative. Obviously, there are many variations and modifications of the present invention in the light of the above teachings. It is to be understood that within the scope of the appended claims the invention may be practiced otherwise than as specifically described.

What is claimed as new and desired to be secured by Letters Patent of the United Stated is:

1. Apparatus for using solar energy to manufacture hydrogen gas by dissociating water molecules into hydrogen and oxygen molecules comprising:
   an inlet tube means for transporting water;
   a hollow globe means affixed to one end of said inlet tube means for receiving the water; said globe means being pervious to hydrogen molecules and being impervious to oxygen molecules and undissociated water molecules;
   an outlet tube means extending into said globe means and being concentrically positioned within said inlet tube means;
   a reflector means for concentrating solar energy on said globe means thereby heating the water contained in said globe means to the dissociation temperature of said water whereupon the water decomposes into hydrogen and oxygen molecules; the hydrogen molecules permeate through said globe means and the oxygen molecules and undissociated water enter said outlet tube means for removal from said globe means; a collector tube means for collecting the hydrogen molecules after the hydrogen molecules pass through said globe means;
   said collector tube means having an enlarged closed end which encases said hollow globe means and a tubular length extending from said enlarged closed end concentrically positioned about said inlet tube means; thereby transferring heat from the hydrogen molecules to the water in said inlet tube means and
   wherein said collector tube means is constructed of material transparent to solar radiation to thereby permit solar radiation to pass through said collector tube means to reach said hollow globe means.

2. The apparatus as set forth in claim 1 wherein said reflector means is a parabolic mirror.

3. The apparatus as set forth in claim 1 wherein said outlet tube means is connected to a first pump which maintains the interior of said outlet tube means at a lower pressure than the interior of said globe means thereby increasing the flow of oxygen molecules and undissociated water molecules through said outlet tube means and wherein the concentric arrangement of said inlet and outlet tubes causes heat transfer from the oxygen molecules and undissociated water molecules in said outlet tube means to the water in said inlet tube means.

4. The apparatus as set forth in claim 3 wherein said collector tube is connected to a second pump which maintains the interior of said collector tube at a lower pressure than the interior of said globe means.

5. The apparatus as set forth in claim 4 wherein said second pump communicates with a hydrogen storage means for receiving the hydrogen molecules.

* * * * *